United States Patent

Sakakibara et al.

[11] Patent Number: 5,928,111
[45] Date of Patent: Jul. 27, 1999

[54] FUEL CUT-OFF AND FUEL-SUPPLY RECOVERY CONTROL SYSTEM FOR INTERNAL COMBUSTION ENGINE COUPLED TO AN AUTOMATIC POWER TRANSMISSION WITH A LOCK-UP TORQUE CONVERTER

[75] Inventors: Satoshi Sakakibara; Hiromasa Sakai, both of Kanagawa, Japan

[73] Assignee: Nissan Motor Co., Ltd., Yokohama, Japan

[21] Appl. No.: 08/963,189

[22] Filed: Nov. 3, 1997

[30] Foreign Application Priority Data

Nov. 6, 1996 [JP] Japan .................................. 8-294052

[51] Int. Cl.$^6$ .................................................. B60K 41/02
[52] U.S. Cl. .............................................. 477/181; 477/54
[58] Field of Search ............................... 477/181, 54, 83, 477/84, 85, 90, 91

[56] References Cited

U.S. PATENT DOCUMENTS

| | | | |
|---|---|---|---|
| 4,484,497 | 11/1984 | Hibino | 477/181 X |
| 5,141,089 | 8/1992 | Nobumoto et al. | 477/181 X |
| 5,626,536 | 5/1997 | Kono et al. | 477/181 |

FOREIGN PATENT DOCUMENTS

58-57048 4/1983 Japan .

Primary Examiner—Charles A. Marmor
Assistant Examiner—Sherry Lynn Estremsky
Attorney, Agent, or Firm—Foley & Lardner

[57] ABSTRACT

A fuel cut-off and fuel-supply recovery control system for an internal combustion engine coupled to an automatic power transmission with a lock-up torque converter having a lock-up device operable at either one of an open converter state and a locked-up state through a lock-up control based on engine and vehicle operating conditions, comprises an electronic control module configured to store a fuel-cut engine speed ($N_1$, $N_3$) above which a fuel cut-off control is executed under a specified engine and vehicle operating condition and a fuel-supply recovery engine speed ($N_2$) below which a fuel-supply recovery control is restarted so that fuel supply to the engine is recovered from the fuel cut-off control. The electronic control module variably determines a hysteresis between the fuel-cut engine speed and the fuel-supply recovery engine speed so that a deviation ($N_3 - N_2$) of the fuel-cut engine speed from the fuel-supply recovery engine speed in the locked-up state is smaller than a deviation ($N_1 - N_2$) of the fuel-cut engine speed from the fuel-supply recovery engine speed in the open converter state.

10 Claims, 3 Drawing Sheets

FUEL CUT-OFF AND FUEL-SUPPLY RECOVERY CONTROL SYSTEM FOR INTERNAL COMBUSTION ENGINE COUPLED TO AN AUTOMATIC POWER TRANSMISSION WITH A LOCK-UP TORQUE CONVERTER

The contents of Application No. TOKUGANHEI 8-294052, filed Nov. 6, 1996, in Japan is hereby incorporated by reference.

BACKGROUND OF THE INVENTION

1. Field of the Invention

The present invention relates to a fuel cut-off and fuel-supply recovery control system for an internal combustion engine coupled to an automatic power transmission with a so-called lock-up torque converter, and specifically to technologies for optimally controlling the timing of beginning of a so-called fuel cut-off control and the timing of beginning of a so-called fuel recovery control in an automotive engine coupled to an automatic transmission employing a lock-up torque converter.

2. Description of the Prior Art

Recently, there have been proposed and developed various fuel cut-off systems which are designed to reduce exhaust emissions and fuel consumption by cutting fuel supply to the engine cylinder or cylinders through the fuel cut-off control. On more later-model cars with a fuel cut-off system, the fuel cut-off control is frequently performed under certain required engine/vehicle operating conditions, such as during vehicle deceleration, during coasting or down-hill operation, to obtain deceleration fuel cut-off, as well as engine speed limitation when the maximum allowable engine speed is reached. For example, when the vehicle is decelerated at engine speeds above a first predetermined reference engine speed, generally called as a "fuel-cut engine speed", the fuel cut-off operation continues until the engine speed drops to the first predetermined reference engine speed. In the conventional fuel cut-off system, a second predetermined reference engine speed is also used to restart or recommence fuel supply to the automotive engine when the engine speed excessively drops down to the second predetermined reference engine speed, to prevent engine stalling which may take place during deceleration fuel cut-off operation. The second predetermined reference engine speed is determined as the minimum possible engine speed capable of executing fuel-cut operation or as an engine-speed lower limit below which there is a risk of engine stall even when the fuel supply is recommenced. The second reference engine speed is generally called as a "fuel-cut recovery engine speed" or simply as a "fuel-recovery engine speed". One such fuel cut-off system has been disclosed in Japanese Patent Provisional Publication No. 58-57048, assigned to the assignee of the present invention. Japanese Patent Provisional Publication No. 58-57048 teaches the provision of a predetermined speed difference (often called an "engine-speed hysteresis") between the fuel-cut engine speed and the fuel-recovery engine speed. Usually, the fuel-cut engine speed is set at a higher level than the fuel-recovery engine speed to prevent undesired hunting. In the prior art system as disclosed in Japanese Patent Provisional Publication No. 58-57048, the aforementioned engine-speed hysteresis is fixed to a predetermined value. According to the deceleration fuel cut-off and fuel-supply recovery control of the system disclosed in Japanese Patent Provisional Publication No. 58-57048, basically, the fuel cut-off control will be brought into operation when the detected engine speed exceeds the predetermined fuel-cut engine speed, whereas the fuel-supply recovery control will be brought into operation when the detected engine speed drops below the predetermined fuel-recovery engine speed. Additionally, the prior art fuel cut-off system disclosed in Japanese Patent Provisional Publication No. 58-57048 is in combination with an automatic transmission control system, for forcibly down-shifting the automatic transmission in response to a braking signal indicating a braking operation and for beginning the fuel-cut again at the predetermined fuel-recovery engine speed lower than the predetermined fuel-cut engine speed when the brakes are applied during coasting, thus increasing the fuel cut-off time duration owing to a rise in engine speed caused by the down-shift. In recent years, many cars are equipped with automatic transmissions with so-called lock-up torque converters which act to mechanically couple the engine crankshaft to the transmission output shaft. As is well known, when a lock-up device incorporated in the lock-up torque converter assumes its converter state (corresponding to a lock-up clutch release position), the engine crankshaft and the transmission output shaft are coupled via fluid in the torque converter in normal operation. On the contrary, when the lock-up device assumes its locked-up state (corresponding to a lock-up clutch engagement position), the engine crankshaft and the transmission output shaft are directly coupled to each other by a mechanical connection (via the lock-up clutch engaged), thus disabling or locking up the torque converter. The converter state will be hereinafter referred to as a "lock-up OFF state", whereas the locked-up state will be hereinafter referred to as a "lock-up ON state". As is generally known, the lock-up clutch includes an apply chamber and a release chamber. The lock-up clutch is generally controllable by the pressure difference between the apply pressure in the apply chamber and the release pressure in the release chamber to operate at either one of at least an open converter zone and a full lock-up zone. In modern automotive vehicles employing automatic transmissions with lock-up torque converters, the lock-up clutch tends to be operated in the lock-up ON state during vehicle coasting in which torque-increase and torque-fluctuation absorbing functions are unnecessary. The lock-up ON state occurring during coasting will be hereinafter referred to as a "coasting lock-up state". In general, the fuel cut-off system operates to cut the fuel supply to the engine during the coasting lock-up state, thus saving fuel and emissions. Such simultaneous execution of both the lock-up operation and the fuel cut-off operation are very effective to reduce fuel consumption, while preventing engine stall.

SUMMARY OF THE INVENTION

Figure 3:
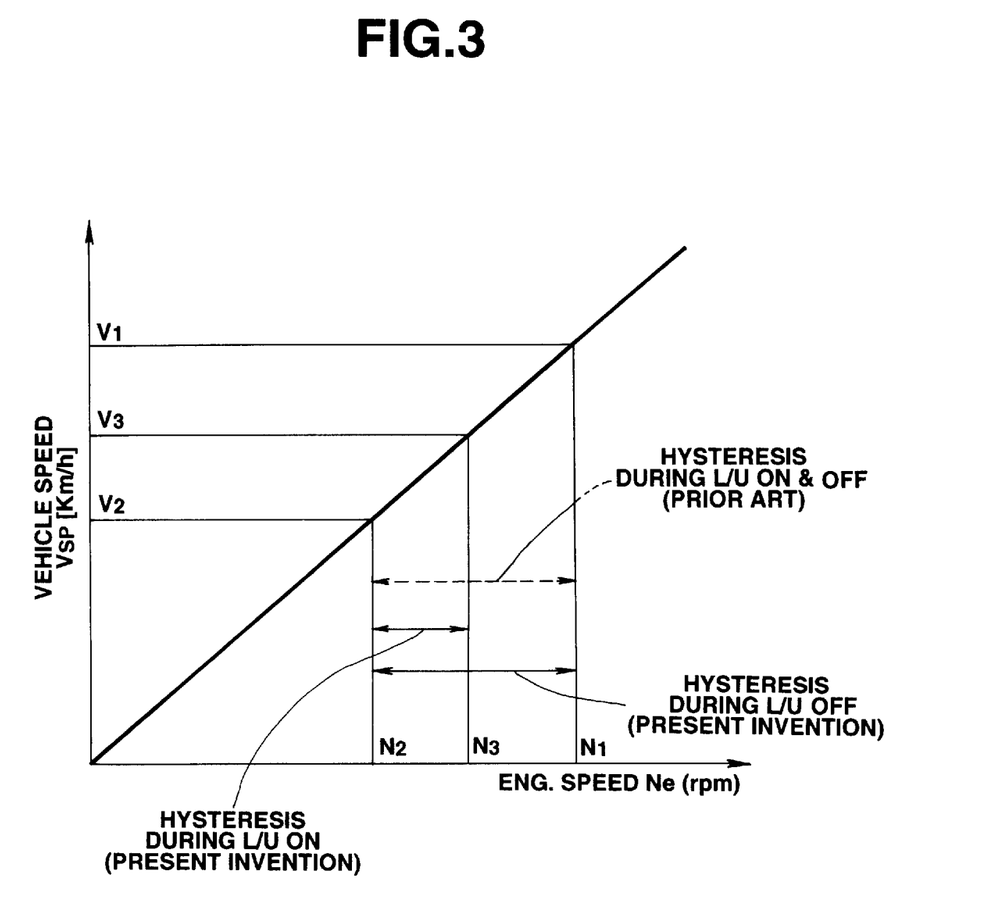
FIG. 3 is a graph illustrating engine-speed hysteresis characteristics used for comparison of the fuel cut-off and fuel-supply recovery control of the present invention to the prior art system.

The prior art system suffers from the following drawbacks owing to the engine-speed hysteresis which is fixed to a predetermined value, regardless of lock-up ON and OFF states. That is, the smaller the engine-speed hysteresis is set, the greater the possibility of undesirable hunting of the fuel cut-off control system becomes under the lock-up OFF state, because the total rotational inertia appearing in the driving system during the lock-up OFF state is smaller than that appearing in the driving system during the lock-up ON state. For the reasons set out above, the engine speed tends to easily rise due to a comparatively smaller rotational inertia when the fuel-supply recovery control begins under the lock-up OFF state. In view of this, it is necessary to set the engine-speed hysteresis for the fuel cut-off and fuel-supply recovery control at a properly great value. To the contrary, if the engine-speed hysteresis is set at an extremely great value and as a result the fuel-cut engine speed is set at an undesiredly high level, the frequency of fuel cut-off operations may be reduced. This never improves fuel economy satisfactorily. On the other hand, the fuel-cut recovery engine speed should be properly determined depending on anti-stalling characteristics of engines. The fuel cut-off and fuel-supply recovery control of the prior art system is hereinafter described in detail by reference to the graph representative of control characteristics shown in FIG. 3. In FIG. 3, an engine speed denoted by "$N_2$" corresponds to an engine-speed lower limit, determined depending on anti-stalling characteristics of an automotive engine mounted on a car. An engine speed denoted by "$N_1$" corresponds to a specified engine speed, being set in the direction of engine-speed increase by a predetermined engine-speed hysteresis from the predetermined engine speed lower limit $N_2$. The engine-speed lower limit $N_2$ is set as a fuel-cut recovery engine speed, whereas the specified engine speed $N_1$ is set as a fuel-cut engine speed. In the prior art system, the predetermined engine-speed hysteresis (indicated by the broken line in FIG. 3) is fixed to a constant value ($N_1$–$N_2$), irrespective of the lock-up ON and OFF states of the lock-up device. As can be appreciated from the broken line of FIG. 3, the engine-speed hysteresis region or zone, defined as the difference between the two predetermined engine speeds $N_1$ and $N_2$, is set at a relatively wide speed range. Assuming that the accelerator pedal is released during driving at a speed below a vehicle speed $V_1$ equivalent to the fuel-cut engine speed $N_1$, the fuel cannot be cut off, since the detected engine speed is within the predetermined hysteresis region, widely ranging from the predetermined engine speed $N_1$ to the predetermined engine speed $N_2$. Such a wide or large engine-speed hysteresis region contributes to avoidance of undesired hunting of the fuel cut-off system, but reduces the frequency of fuel cut-off operations. That is, the wider the engine-speed hysteresis, the narrower the fuel-cut operating region (or the fuel cut-off executable region). The decreased tendency of the fuel cut-off is remarkable in automotive vehicles capable of executing the previously-noted coasting lock-up state. So, it is desirable to balance and satisfy these two requirements, namely avoidance of hunting of the fuel cut-off and fuel-supply recovery control system and improvement of fuel consumption, even in automotive engines coupled to automatic transmissions with lock-up torque converters. Also, it is desirable to effectively expand the fuel cut-off executable region during coasting lock-up control to provide adequate effect (i.e., improvement of fuel economy) of the fuel cut-off executed during coasting lock-up control.

Accordingly, it is an object of the invention to provide a fuel cut-off and fuel-supply recovery control system for an internal combustion engine coupled to an automatic power transmission with a lock-up torque converter, which avoids the aforementioned disadvantages of the prior art.

It is another object of the invention to provide a fuel cut-off and fuel-supply recovery control system for an internal combustion engine coupled to an automatic power transmission with a lock-up torque converter, which is capable of balancing both avoidance of hunting of the control system and improvement of fuel consumption (or increase in the frequency of fuel cut-off operations), accounting for lock-up ON and OFF states.

It is a further object of the invention to provide a fuel cut-off and fuel-supply recovery control system for an internal combustion engine coupled to an automatic power transmission with a lock-up torque converter, which is capable of expanding a fuel cut-off executable region during coasting lock-up control to ensure adequate effect of the fuel cut-off and to improve fuel economy.

In order to accomplish the aforementioned and other objects of the present invention, a fuel cut-off and fuel-supply recovery control system for an internal combustion engine coupled to an automatic power transmission with a lock-up torque converter having a lock-up device operable at either one of an open converter state and a locked-up state through a lock-up control based on engine and vehicle operating conditions, the system comprises a control unit configured to store a fuel-cut engine speed above which a fuel cut-off control is executed under a specified engine and vehicle operating condition and a fuel-supply recovery engine speed below which a fuel-supply recovery control is restarted so that fuel supply to the engine is recovered from the fuel cut-off control, wherein the control unit variably determines a hysteresis between the fuel-cut engine speed and the fuel-supply recovery engine speed so that a deviation of the fuel-cut engine speed from the fuel-supply recovery engine speed in the locked-up state is smaller than a deviation of the fuel-cut engine speed from the fuel-supply recovery engine speed in the open converter state, and wherein the control unit executes the fuel cut-off and fuel-supply recovery control based on the hysteresis variably determined depending on whether the lock-up device is in the open converter state or in the locked-up state.

According to another aspect of the invention, a fuel cut-off and fuel-supply recovery control system for an automotive vehicle employing an internal combustion engine operable in accordance with a fuel cut-off and fuel-supply recovery control and an automatic power transmission with a lock-up converter having a lock-up device, the system comprises a lock-up control unit for controlling the lock-up device at either one of an open converter state and a locked-up state through a lock-up control based on engine and vehicle operating conditions, a lock-up detector for detecting that the lock-up device is in the locked-up state and for generating a signal representative of the locked-up state, an engine control unit for storing a fuel-cut engine speed above which a fuel cut-off control is executed under specified engine and vehicle operating conditions and a fuel-supply recovery engine speed below which a fuel-supply recovery control is restarted so that fuel supply to the engine is recovered from the fuel cut-off control, wherein the engine control unit decreasingly compensates for the fuel-cut engine speed only in the presence of output of the signal representative of the locked-up state. Preferably, the lock-up control executed by the lock-up control unit may include at least a coasting lock-up control being executed during vehicle coasting, and wherein the engine control unit is configured to determine that the vehicle is in a coasting state, and wherein the engine control unit decreasingly compensates for the fuel-cut engine speed by a predetermined value when the lock-up detector detects that the lock-up device is in the locked-up state during the coasting lock-up control. More preferably, the fuel-supply recovery engine speed is fixed to a predetermined constant value regardless of the locked-up and open converter states, the fuel-cut engine speed in the open converter state is set at a first predetermined engine speed, and the fuel-cut engine speed in the locked-up state is set at a second predetermined engine speed greater than the predetermined constant value and less than the first predetermined engine speed, and whereby the first predetermined engine speed and the fuel-supply recovery engine speed defines a great hysteresis in the open converter state, whereas the second predetermined engine speed and the fuel-supply recovery engine speed defines a small hysteresis in the locked-up state, and thus the engine control unit selects the great hysteresis when the lock-up device is in the open converter state and selects the small hysteresis when the lock-up device is in the locked-up state. It is preferable that the great hysteresis is set at generally 350 rpm, while the small hysteresis is set at generally 200 rpm.

According to a further aspect of the invention, a fuel cut-off and fuel-supply recovery control system for an internal combustion engine coupled to an automatic power transmission with a lock-up torque converter having a lock-up device, the system comprises a lock-up control means being responsive to both a throttle opening and a vehicle speed for controlling the lock-up device at either one of an open converter state and a locked-up state through a lock-up control based on the throttle opening and the vehicle speed, an engine control means for storing a fuel-cut engine speed above which a fuel cut-off control is executed under specified engine and vehicle operating conditions and a fuel-supply recovery engine speed below which a fuel-supply recovery control is restarted so that fuel supply to the engine is recovered from the fuel cut-off control, and the lock-up control means generates a signal representative of a locked-up state during the lock-up control, wherein the engine control means variably determines a hysteresis so that a first predetermined hysteresis between the fuel-cut engine speed and the fuel-supply recovery engine speed in the open converter state is greater than a second predetermined hysteresis between the fuel-cut engine speed and the fuel-supply recovery engine speed in the locked-up state, and wherein the engine control means executes the fuel cut-off and fuel-supply recovery control based on the hysteresis variably determined depending on whether the lock-up device is in the open converter state or in the locked-up state.

DESCRIPTION OF THE PREFERRED EMBODIMENTS

Figure 1:
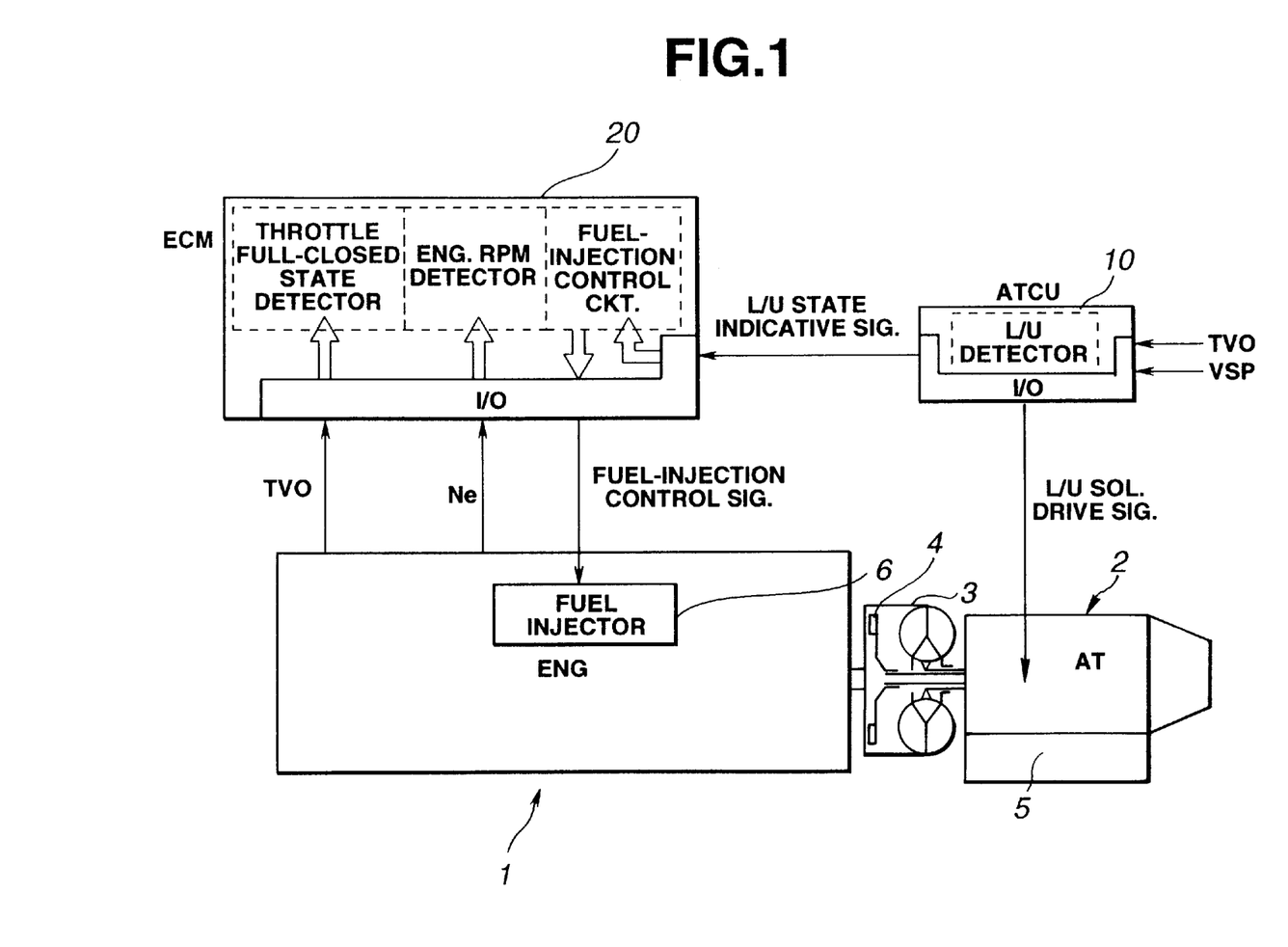
FIG. 1 is an operational diagram of a fuel cut-off and fuel-supply recovery control system of the present invention, in combination with an automatic transmission control system unit (ATCU).

Referring now to the drawings, particularly to FIG. 1, the fuel cut-off and fuel-supply recovery control system of the invention is exemplified in an electronic fuel-injection type internal combustion engine 1 coupled to an automatic power transmission 2 with a lock-up torque converter 3. Output engine power from the engine 1 is transmitted via the lock-up torque converter 3 to the input shaft of the transmission 2. The transmission input shaft rotational speed is changeable by properly combining ON and OFF states of shift solenoids (not shown) placed in a control valve 5, (usually attached to the bottom of the automatic transmission) in accordance with a gear ratio automatically selected depending on a vehicle speed and a throttle opening. The properly regulated power is transmitted to the transmission output shaft. In FIG. 1, reference sign 4 denotes a lock-up device. Although it is not clearly shown in FIG. 1, the lock-up device comprises a lock-up clutch (serving as a lock-up piston) including an apply chamber to which an apply pressure is applied and a release chamber to which a release pressure is applied. The lock-up clutch is operatively arranged between an input element (for example an engine crankshaft) in driven connection with the engine 1 and an output element (for example an automatic transmission input shaft) in driving connection with a power train including the automatic transmission 2. In a conventional manner, the lock-up clutch is controllable by the pressure difference between the apply and release pressures to operate at either one of two operational zones, namely an open converter zone (a lock-up OFF state) at which the lock-up clutch is released and a full lock-up zone (a lock-up OFF state) at which the lock-up clutch is completely engaged. The two operational zones are traditionally predetermined depending upon two operating parameters, namely a vehicle speed (approximately equivalent to a transmission output shaft rotational speed) and an opening degree (or an opening angle) of a throttle opening. The lock-up ON-OFF states are usually switchable through a duty-cycle control (simply a duty control) for a lock-up solenoid (not shown) incorporated in the control valve 5, in a conventional manner. Also provided is an automatic transmission control unit 10 (abbreviated to "ATCU") to obtain the ON-OFF control for each shift solenoid and the duty-cycle control for the lock-up solenoid. As is well known, the shift solenoids are provided for automatic selection of a gear ratio in the transmission, whereas the lock-up solenoid is provided for a lock-up control for the lock-up device. The ATCU includes a conventional input/output interface unit to receive at least a vehicle-speed indicative signal VSP from a vehicle speed sensor (not shown) and a throttle opening indicative signal TVO from a throttle-opening sensor (not shown), as input information. The vehicle speed indicative signal VSP is generated from a standard vehicle speed sensor which is generally located at either the transmission or the transaxle (in front-wheel drive vehicles) to monitor the output shaft speeds of the road wheels. The throttle opening indicative signal TVO is traditionally generated from a standard throttle position sensor which is generally located on the throttle body and connected to the throttle shaft to monitor the throttle opening such as a throttle angle. In the lock-up control executed by the ATCU 10, a test is made to determine or decide whether a current engine/vehicle operating condition is included in the full lock-up zone in which torque-increase and torque-fluctuation absorbing functions are both unnecessary or in the open converter zone in which torque-increase and torque-fluctuation absorbing functions are both necessary. The ATCU generates a lock-up solenoid drive signal of a duty ratio calculated on the basis of the decided engine/vehicle operating condition and thus the activated (operative) and deactivated (inoperative) states for the lock-up solenoid are achieved cyclically in response to the calculated duty cycle. The ATCU 10 includes a lock-up detector which uses the information representative of the decided engine/vehicle operating condition to detect or determine whether the lock-up clutch is operated in the full lock-up zone. The ATCU 10 is connected via a signal line to an electronic engine control module (or an electronic engine control unit) 20 (usually abbreviated to "ECM") to output a locked-up state indicative signal from the lock-up detector to the ECM 20, if the decided engine/vehicle operating condition is identical to the full lock-up zone (the locked-up state). When the engine/vehicle operating condition corresponds to the vehicle coasting wherein the accelerator pedal is released and also the ECM 20 receives the locked-up state indicative signal from the ATCU, the ECM performs a fuel cut-off control (as will be fully described later by reference to the flow chart illustrated in FIG. 2) in response to the so-called coasting lock-up control, in order to avoid engine stalling and to improve fuel consumption. In brief, according to the fuel cut-off and fuel-supply recovery control of the invention, an engine-speed change (i.e., a drop in engine speed Ne) is retarded due to an increased rotational inertia of the driving system (with the lock-up clutch held at the fully locked-up state) and also the fuel cut-off time duration is increased due to decreasing compensation for an engine-speed hysteresis, when the ECM 20 determines that it is able to perform the fuel cut-off through the routine indicated in FIG. 2 during the vehicle coasting. The increase in fuel cut-off time duration contributes to fuel economy and reduction of exhaust emissions. Thus, during the vehicle coasting, the ATCU 10 performs the coasting lock-up control, accounting for avoidance of engine stalling and improvement of fuel economy. The ATCU 10 of the automatic transmission with the lock-up torque converter, performs a lock-up control as well as a conventional gear-ratio changing control. As seen in FIG. 1, the lock-up control for the lock-up torque converter is executed in response to a lock-up solenoid drive signal which is output from the ATCU 10 and correlates to the pressure difference between the apply and release pressures. The previously-noted ECM 20 includes an input/output interface unit (I/O), a throttle fully-closed state detector, and an engine speed detector, and a fuel-injection control circuit. The throttle fully-closed state detector determines on the basis of a value of the throttle-opening indicative signal TVO transferred via the I/O, whether the throttle valve is fully closed. The engine speed detector detects a current engine speed on the basis of a value of the engine speed indicative signal Ne transferred via the I/O. The engine speed indicative signal Ne is generally input into the I/O of the ECM from an engine speed sensor such as a crank-angle sensor or a crank position sensor. The I/O of the ECM 20 receives a lock-up state indicative signal (which signals that the lock-up device is in the fully locked-up state) from the ATCU 10 to initiate a fuel cut-off control (as discussed later) in correlation with the lock-up control. The fuel-injection control circuit included in the ECM is connected via the I/O to a fuel injector 6 associated with each individual engine cylinder. On the basis of the previously-mentioned input data or input information, the amount of fuel injected by the fuel injector 6 and the length of time (e.g., a fuel-injection pulse width) the injector 6 is open, are both determined by the ECM. The ECM outputs a fuel-injection control signal (involving both the fuel amount injected and the fuel-injection pulse width) through the fuel-injection control circuit of the ECM via the I/O to the injector 6, to control the engine in response to the fuel-injection control signal. The ECM 20 performs the fuel cut-off and fuel-supply recovery control in the control routine shown in FIG. 2 in response to the input information data. As detailed later, during the fuel cut-off and fuel-supply recovery control, the ECM 20 variably adjusts or controls a so-called engine-speed hysteresis which is obtained by way of subtraction of a fuel-recovery engine speed from the fuel-cut engine speed, depending on the lock-up ON and OFF states of the lock-up device 4, so that an engine-speed hysteresis ($N_3-N_2$) selected in the lock-up ON state is set at a smaller value than an engine-speed hysteresis ($N_1-N_2$) selected in the lock-up OFF state. Preferably, as shown in FIG. 3, according to the variable control of the hysteresis, which is executed by the ECM, the fuel-supply recovery engine speed is fixed to a predetermined lower limit $N_2$ and additionally a fuel-cut engine speed ($N_3$) to be used in the lock-up ON state is obtained by reducing a fuel-cut engine speed ($N_1$) to be used in the lock-up OFF state by a predetermined decrement (for example 150 rpm). In the shown embodiment, the fuel-supply recovery engine speed $N_2$ is in common in case of both the lock-up ON and OFF states, whereas two different hystereses (a large hysteresis such as 350 rpm and a small hysteresis such as 200 rpm) are properly selectable by the ECM depending on the lock-up ON or OFF states. As previously discussed, under the lock-up ON state, there is a decreased tendency for hunting of the system to occur, because of a relatively great inertia of the driving system with the lock-up clutch fully engaged. Thus, the engine-speed hysteresis region or zone (during the lock-up ON state) can be set narrower as compared with an engine-speed hysteresis ($N_1-N_2$) selected during the lock-up OFF state. In other words, assuming that the fuel-recovery control comes into operation during the lock-up ON state, the engine speed does not easily rise due to the relatively great inertia. Under such a lock-up ON state, the engine-speed hysteresis can be set at a comparatively small value, for example the speed difference ($N_3-N_2$) which is obtained as a deviation of the fuel-cut engine speed $N_3$ with respect to the fuel-supply recovery engine speed $N_2$. As may be appreciated, the relatively small engine-speed hysteresis ($N_3-N_2$) selected during the lock-up ON state contributes to increase in the frequency of fuel cut-off control operations, while preventing hunting of the fuel cut-off and fuel-supply recovery control system. Thus, the comparatively small hysteresis ($N_3-N_2$) selected during the lock-up ON state can effectively balance two different contradictory requirements, namely avoidance of hunting of the system and improvement of fuel consumption. In the system of the embodiment, assuming that the vehicle is running at a certain speed above a vehicle speed $V_3$ (corresponding to the fuel-cut engine speed $N_3$) during the lock-up ON state, the system may begin the fuel cut-off operation as soon as the accelerator pedal is released by the driver. As set forth above, in the lock-up ON state, the ECM 20 decreasingly compensates for the fuel-cut engine speed so that the fuel-cut engine speed is changed or reduced from a speed $N_1$ to a speed $N_3$. The decreasing compensation for the fuel-cut engine speed largely contributes to expansion or increase in a fuel cut-off executable region in the lock-up ON state, thereby improving fuel economy. On the other hand, the fuel-supply recovery engine speed is fixed to a predetermined lower limit $N_2$ (correlated to an anti-stalling characteristic of the engine mounted on the vehicle) irrespective of the lock-up ON and OFF states. In this manner, in the embodied system, the desired engine-speed hysteresis can be determined on the basis of only three engine revolution speeds, namely a first fuel-cut engine speed $N_1$, a second fuel-cut engine speed $N_3$ and a fuel-supply recovery engine speed $N_2$ fixed to a predetermined constant value. The first fuel-cut engine speed will be hereinafter referred to as a "lock-up OFF state fuel-cut speed", the second fuel-cut engine speed will be hereinafter referred to as a "lock-up ON state fuel-cut speed". If the fuel-supply recovery engine speed $N_2$ is variably set, it will be appreciated that determination of the engine-speed hysteresis is complicated, in comparison with the embodied system. In view of this, the system of the embodiment is simple.

Figure 2:
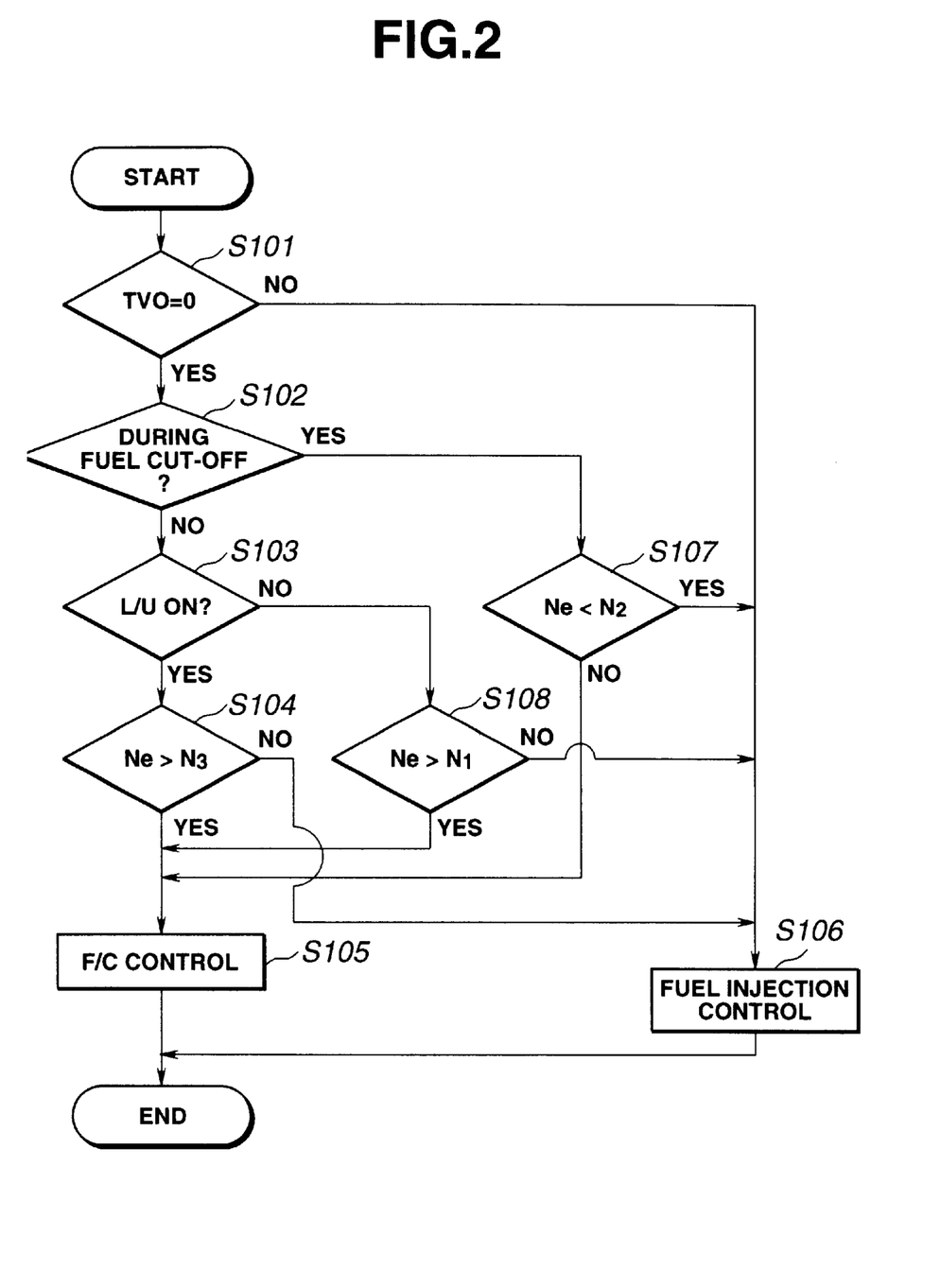
FIG. 2 is a flow chart illustrating a fuel cut-off and fuel-supply recovery control executed by the system of the invention, related to a lock-up control for a lock-up torque converter.

Referring now to FIG. 2, there is shown one example of the fuel cut-off and fuel-supply recovery control routine (or the fuel-cut engine speed changing routine) of the system of the embodiment. In the routine shown in FIG. 2, a predetermined engine speed $N_2$ is used as a fuel-supply recovery engine speed and determined depending on an anti-stalling characteristic of the engine 1 shown in FIG. 1. In the shown embodiment, the fuel-supply recovery engine speed $N_2$ is fixed to a predetermined constant value. A predetermined engine speed $N_3$ is used as a lock-up ON state fuel-cut engine speed, whereas a predetermined engine speed $N_1$ is used as a lock-up OFF state fuel-cut engine speed. Although it is not clearly shown in FIG. 1, these three engine-speed data ($N_1 > N_3 > N_2$) are stored in a memory unit (e.g., ROM or EEROM) of the ECM 20 as engine-speed criteria data necessary for decision blocks such as steps S104, S107 and S108 of FIG. 2. The routine shown in FIG. 2 is generally executed as time-triggered interrupt routines to be triggered every predetermined intervals.

In step S101 of FIG. 2, in the throttle fully-closed state detector of the ECM, a test is made to determine whether a throttle opening TVO is "0", that is, the throttle valve is in its fully closed state. When the answer to step S101 is in the negative (NO), i.e., in case of TVO≠0, the ECM determines that the accelerator pedal is depressed and thus step S106 occurs. In step S106, the ECM continues a conventional fuel-injection control based on the fuel-injection control signal, and thus one cycle of the routine terminates. On the contrary, when the answer to step S101 is in the affirmative (YES), i.e., in case of TVO=0, the ECM determines that the accelerator pedal is released and then step S102 occurs. In step S102, a test is made to determine whether the ECM executes a fuel cut-off control operation in the currently-triggered control cycle or routine. When the answer to step S102 is affirmative, i.e., the ECM determines that the system is in the fuel cut-off control, step S107 occurs. In step S107, a test is made to determine whether the engine speed indicative signal Ne is compared with the predetermined fuel-supply recovery engine speed $N_2$ (for example approximately 1500 rpm), that is to say, a check is made to decide whether a current value of the engine speed indicative signal Ne is less than the predetermined engine speed $N_2$. At this time, the predetermined fuel-supply recovery engine speed $N_2$ can be read from the memory. In the same manner, two predetermined engine speeds $N_1$ and $N_3$ (respectively used in steps 108 and S104) can be read from the memory. When the answer to step S107 is affirmative, the ECM determines that the current engine speed indicative signal value Ne is less than the predetermined engine speed $N_2$ (the fuel-recovery engine speed). The fuel-supply recovery control thus comes into operation, and then step S106 occurs to restart the fuel supply and consequently prevent engine stalling. In this manner, according to the flow from step S102 via step S107 to step S106, the fuel cut-off operation falls into abeyance and in lieu thereof the fuel-supply recovery control comes into operation. Conversely, when the answer to step S107 is negative (NO), the ECM determines that the current engine speed indicative signal value Ne is above the predetermined fuel-supply recovery engine speed $N_2$ during the fuel cut-off operation. In this case, the ECM decides that it is able to continue the fuel cut-off operation, since there is no risk of engine stalling due to the condition of Ne>$N_2$. Therefore, step S105 proceeds in which the system continuously executes the fuel cut-off control, and then the current routine ends. Such continuous fuel cut-off control operation improves fuel consumption. Returning to step S102, when the answer to step S102 is in the negative, the ECM determines that the system is in the fuel-supply state but not in the fuel cut-off state. Thereafter, step S103 occurs. In step S103, a test is made to determine whether the input of the lock-up state indicative signal from the ATCU 10 is present or absent. That is to say, in step S103, a check is made to determine whether the lock-up device is in the lock-up ON state or in the lock-up OFF state. When the answer at step S103 is in the negative (NO), that is the lock-up device is in the lock-up OFF state, step S108 is entered. In step S108, a test is made to determine whether the current engine speed indicative signal value Ne is greater than the predetermined lock-up OFF state fuel-cut engine speed $N_1$. The deviation of the predetermined lock-up OFF state fuel-cut engine speed $N_1$ from the predetermined fuel-supply recovery engine speed $N_2$ functions as a preselected engine-speed hysteresis used for a fuel cut-off and fuel-supply recovery control executed during the lock-up OFF condition. The preselected engine-speed hysteresis ($N_1 - N_2$) is preset as a given wide hysteresis region or zone (for example substantially 350 rpm) enough to prevent hunting of the fuel cut-off control system, accounting for a rise of the engine revolution speed during the lock-up OFF state. As mentioned above, if the preselected wide engine-speed hysteresis ($N_1 - N_2$) is set at approximately 350 rpm and the predetermined fuel-supply recovery engine speed $N_2$ is set at approximately 1500 rpm, the predetermined lock-up OFF state fuel-cut engine speed $N_1$ corresponds to substantially 1850 rpm. When the answer at step S108 is in the negative, in case of Ne≦$N_1$, step S106 occurs in which the fuel-injection control operation is selected to continue the fuel supply to the engine. On the contrary, when the answer to step S108 is in the affirmative, (in case of Ne>$N_1$), step S105 is entered to select the fuel cut-off control operation. As will be appreciated from the above, if the lock-up device is in the lock-up OFF state and the fuel cut-off is not yet brought into operation when the vehicle is coasting with the accelerator pedal released, the procedure flows from step S101 through steps S102, S103 and S108, and then flows to either one of steps S105 (the fuel cut-off control) and S106 (the fuel-injection control) depending on the result of comparison between the engine-speed input information data Ne and the predetermined lock-up OFF state fuel-cut engine speed $N_1$. If the system has already been in the fuel cut-off control when the vehicle is coasting with the accelerator pedal released, the procedure flows from step S101 through steps S102 and S107 and then flows to either one of steps S105 (the fuel cut-off control) and S106 (the fuel-injection control) depending on the result of comparison between the engine-speed input information data Ne and the predetermined fuel-supply recovery engine speed $N_2$. As discussed above, the fuel cut-off control system of the embodiment provides an optimal fuel cut-off and fuel-supply recovery control, preventing hunting of the system under the lock-up OFF state in which the inertia appearing in the driving system is comparatively small.

Returning to step S103, when the answer to step S103 is affirmative (YES), that is when the lock-up device is in the lock-up ON state, step S104 occurs. In step S104, a test is made to determine whether the current engine speed indicative signal value Ne is greater than the predetermined lock-up ON state fuel-cut engine speed $N_3$. Note that the predetermined lock-up ON state fuel-cut engine speed $N_3$ is used as the criterion data in place of the predetermined lock-up OFF state fuel-cut engine speed $N_1$, under the lock-up ON state during the vehicle coasting (TVO=0), and that the predetermined lock-up ON state fuel-cut engine speed $N_3$ is greater than the predetermined fuel-supply recovery engine speed $N_2$ and less than the predetermined lock-up OFF state fuel-cut engine speed $N_1$. The deviation ($N_3 - N_2$) from the fuel-supply recovery engine speed $N_2$ means a preselected engine-speed hysteresis used for a fuel cut-off and fuel-supply recovery control executed during the lock-up ON condition. As may be appreciated, the preselected engine-speed hysteresis ($N_3-N_2$) is preset as a given narrow hysteresis region or zone (for example substantially 200 rpm) so that the narrow hysteresis region ($N_3-N_2$) is reduced or decremented by about 150 rpm with respect to the wide hysteresis region ($N_1-N_2$). If the preselected narrow engine-speed hysteresis ($N_3-N_2$) is set at approximately 200 rpm and the predetermined fuel-supply recovery engine speed $N_2$ is set at approximately 1500 rpm, the predetermined lock-up ON state fuel-cut engine speed $N_3$ corresponds to substantially 1700 rpm. When the answer at step S104 is negative (NO), i.e., in case of $Ne \leq N_3$, step S106 occurs in which the fuel-injection control operation is selected to continue the fuel supply to the engine. When the answer at step S104 is affirmative (YES), i.e., in case of $Ne > N_3$, step S105 proceeds to select the fuel cut-off control operation. As explained above, if the lock-up device is in the lock-up ON state and the fuel cut-off is not yet brought into operation when the vehicle is coasting with the accelerator pedal released, the procedure flows from step S101 through steps S102, S103 and S104, and then flows to either one of steps S105 and S106 depending on the result of comparison between the engine-speed input information data Ne and the predetermined lock-up ON state fuel-cut engine speed $N_3$. As set forth above, a second predetermined engine speed ($N_3$), which serves as a criteria data necessary for beginning of the fuel cut-off control executed during the lock-up ON state, is decreasingly compensated in comparison with a first predetermined engine speed ($N_1$), which serves as a criteria data necessary for beginning of the fuel cut-off control executed during the lock-up OFF state, however there is less possibility of hunting of the fuel cut-off control system due to a relatively great rotational inertia appearing in the driving system during the lock-up ON state. Thus, when the accelerator pedal is released during driving at certain vehicle speeds above but closer to a vehicle speed (VSP) corresponding to the predetermined engine speed $N_3$, and then the so-called coasting lock-up control for the lock-up device begins, the fuel cut-off control can be effectively executed almost in synchronization with the coasting lock-up control (see the flow from step S101 through steps S102, S103 and S104 to step S105 in FIG. 2). During the coasting lock-up state, the decreasing compensation for the fuel-cut engine speed results in a proper decrease in the engine-speed hysteresis zone, thus effectively increase the frequency of shifting from the fuel-injection control to the fuel cut-off control. In other words, the fuel cut-off executable region is actually expanded due to the decreasing compensation for the engine-speed hysteresis zone (that is, the shift from the hysteresis ($N_1-N_2$) to the hysteresis ($N_3-N_2$)), during the coasting lock-up control. This improves fuel economy. The relatively great rotational inertia appearing in the driving system during the lock-up ON state contributes to both prevention of hunting of the system and avoidance of engine stalling.

In the shown embodiment, the routine shown in FIG. 2 is performed by the ECM 20. In lieu thereof, a separate control unit may be utilized as an integrated control unit. In such a case, it is desirable to design the integrated control unit so that a first flag, signaling that the system is in a fuel cut-off permissible state, is set at step S105 of FIG. 2 and also a second flag, signaling that the system is in a fuel-injection permissible state, is set at step S106, and so that the electronic engine control module (ECM) executes either one of the fuel cut-off control and the fuel-injection control in response to the first and second flags. The system of the embodiment is achieved at a lower cost rather than using the separate control unit.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fuel cut-off and fuel-supply recovery control system for an internal combustion engine coupled to an automatic power transmission with a lock-up torque converter having a lock-up device operable at either one of an open converter state and a locked-up state through a lock-up control based on engine and vehicle operating conditions, said system comprising:

a control unit being configured to store a fuel-cut engine speed ($N_1$, $N_3$) above which a fuel cut-off control is executed under specified engine and vehicle operating conditions and a fuel-supply recovery engine speed ($N_2$) below which a fuel-supply recovery control is restarted so that fuel supply to the engine is recovered from the fuel cut-off control, wherein said control unit variably determines a hysteresis between said fuel-cut engine speed and said fuel-supply recovery engine speed so that a deviation ($N_3-N_2$) of said fuel-cut engine speed from said fuel-supply recovery engine speed in the locked-up state is smaller than a deviation ($N_1-N_2$) of said fuel-cut engine speed from said fuel-supply recovery engine speed in the open converter state, and wherein said control unit executes the fuel cut-off and fuel-supply recovery control based on said hysteresis variably determined depending on whether the lock-up device is in the open converter state or in the locked-up state.

2. A fuel cut-off and fuel-supply recovery control system for an automotive vehicle employing an internal combustion engine operable in accordance with a fuel cut-off and fuel-supply recovery control and an automatic power transmission with a lock-up converter having a lock-up device, said system comprising:

a lock-up control unit for controlling the lock-up device at either one of an open converter state and a locked-up state through a lock-up control based on engine and vehicle operating conditions;

a lock-up detector for detecting that the lock-up device is in the locked-up state and for generating a signal representative of the locked-up state;

an engine control unit for storing a fuel-cut engine speed ($N_1$, $N_3$) above which a fuel cut-off control is executed under specified engine and vehicle operating conditions and a fuel-supply recovery engine speed ($N_2$) below which a fuel-supply recovery control is restarted so that fuel supply to the engine is recovered from the fuel cut-off control, wherein said engine control unit decreasingly compensates for said fuel-cut engine speed only in the presence of output of said signal representative of the locked-up state.

3. The system as claimed in claim 2, wherein the lock-up control executed by said lock-up control unit includes at least a coasting lock-up control being executed during vehicle coasting, and wherein said engine control unit is configured to determine that the vehicle is in a coasting state, and wherein said engine control unit decreasingly compensates for said fuel-cut engine speed by a predetermined value when said lock-up detector detects that the lock-up device is in the locked-up state during the coasting lock-up control.

4. The system as claimed in claim 3, wherein said fuel-supply recovery engine speed is fixed to a predetermined constant value ($N_2$) regardless of the locked-up and open converter states, said fuel-cut engine speed in the open converter state is set at a first predetermined engine speed ($N_1$), and said fuel-cut engine speed in the locked-up state is set at a second predetermined engine speed ($N_3$) greater than said predetermined constant value ($N_2$) and less than said first predetermined engine speed ($N_1$), and whereby said first predetermined engine speed ($N_1$) and said fuel-supply recovery engine speed ($N_2$) defines a great hysteresis ($N_1-N_2$) in the open converter state, and said second predetermined engine speed ($N_3$) and said fuel-supply recovery engine speed ($N_2$) defines a small hysteresis ($N_3-N_2$) in the locked-up state, and thus said engine control unit selects said great hysteresis when the lock-up device is in the open converter state and selects said small hysteresis when the lock-up device is in the locked-up state.

5. The system as claimed in claim 4, wherein said great hysteresis is set at generally 350 rpm, while said small hysteresis is set at generally 200 rpm.

6. A fuel cut-off and fuel-supply recovery control system for an internal combustion engine coupled to an automatic power transmission with a lock-up torque converter having a lock-up device, said system comprising:

a lock-up control means being responsive to both a throttle opening (TVO) and a vehicle speed (VSP) for controlling the lock-up device at either one of an open converter state and a locked-up state through a lock-up control based on said throttle opening and said vehicle speed;

an engine control means for storing a fuel-cut engine speed ($N_1$, $N_3$) above which a fuel cut-off control is executed under specified engine and vehicle operating conditions and a fuel-supply recovery engine speed ($N_2$) below which a fuel-supply recovery control is restarted so that fuel supply to the engine is recovered from the fuel cut-off control; and said lock-up control means generates a signal representative of a locked-up state during the lock-up control;

wherein said engine control means variably determines a hysteresis so that a first predetermined hysteresis ($N_1-N_2$) between said fuel-cut engine speed ($N_1$) and said fuel-supply recovery engine speed ($N_2$) in the open converter state is greater than a second predetermined hysteresis ($N_3-N_2$) between said fuel-cut engine speed ($N_3$) and said fuel-supply recovery engine speed ($N_2$) in the locked-up state, and wherein said engine control means executes the fuel cut-off and fuel-supply recovery control in response to said hysteresis variably determined depending on whether the lock-up device is in the open converter state or in the locked-up state.

7. The system as claimed in claim 6, wherein said fuel-supply recovery engine speed is fixed to a predetermined constant value ($N_2$) regardless of the locked-up and open converter states, said fuel-cut engine speed in the open converter state is set at a first predetermined engine speed ($N_1$), and said fuel-cut engine speed in the locked-up state is set at a second predetermined engine speed ($N_3$) greater than said predetermined constant value ($N_2$) and less than said first predetermined engine speed ($N_1$).

8. A fuel cut-off and fuel-supply recovery control method for controlling fuel cut-off and fuel-supply recovery for an internal combustion engine coupled to an automatic power transmission with a lock-up torque converter having a lock-up device, comprising the steps of:

detecting a fully-closed state of a throttle valve by comparing a detected throttle opening with a predetermined value corresponding to the fully-closed state;

determining whether a fuel cut-off control is put into operation or a fuel-injection control is put into operation;

determining whether the lock-up device is operated at a locked-up state or at an open converter state;

reading a required one among a predetermined fuel-supply recovery engine-speed data ($N_2$), a first predetermined fuel-cut engine speed data ($N_1$), and a second predetermined fuel-cut engine-speed data ($N_3$) being greater than the predetermined fuel-supply recovery engine-speed data ($N_2$) and less than the first predetermined fuel-cut engine speed data ($N_1$), in the presence of requirement of comparison of either one of the first and second fuel-cut engine-speed data and the predetermined fuel-supply recovery engine-speed data to an engine speed input information (Ne);

comparing the engine speed input information (Ne) with the predetermined fuel-supply recovery engine-speed data ($N_2$) during the fuel cut-off control with the throttle valve fully closed;

comparing the engine speed input information (Ne) with the first predetermined fuel-cut engine-speed data ($N_1$) during the open converter state without the fuel cut-off but with the throttle fully opened;

comparing the engine speed input information (Ne) with the second predetermined fuel-cut engine-speed data ($N_3$) during the locked-up state without the fuel cut-off but with the throttle fully opened;

recovering fuel supply to the engine when the engine speed input information is less than the predetermined fuel-supply recovery engine-speed data during the fuel cut-off control;

cutting off fuel supply to the engine when the engine speed input information exceeds the first predetermined fuel-cut engine-speed data in the open converter state; and cutting off fuel supply to the engine when the engine speed input information exceeds the second predetermined fuel-cut engine-speed data in the locked-up state.

9. The method of claim 8, wherein the predetermined fuel-supply recovery engine speed data is fixed to a constant value ($N_2$).

10. The method of claim 9, wherein a deviation ($N_1-N_2$) of the first predetermined fuel-cut engine-speed data from the predetermined fuel-supply recovery engine speed data is set at substantially 350 rpm, while a deviation ($N_3-N_2$) of the second predetermined fuel-cut engine-speed data from the predetermined fuel-supply recovery engine speed data is set at substantially 200 rpm.

* * * * *